Figure 1:
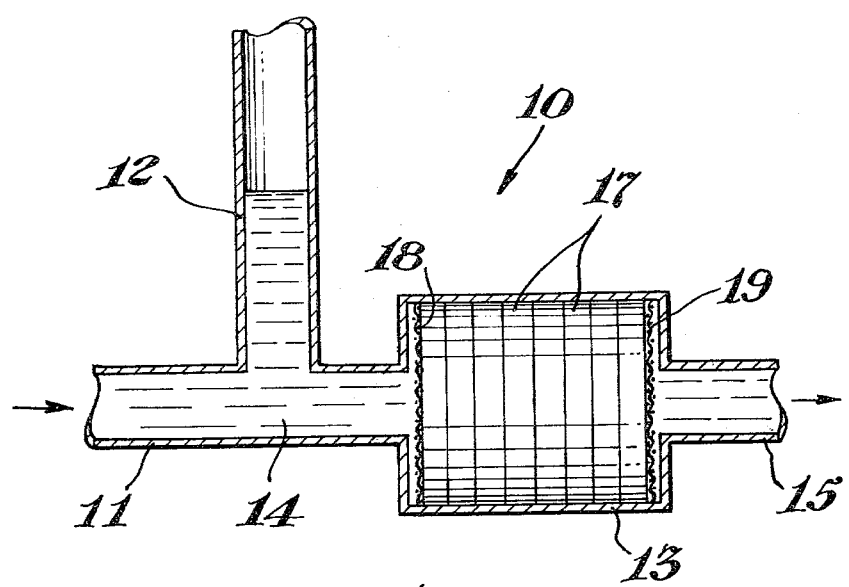

United States Patent [19]

Larson et al.

[11] 4,302,337
[45] Nov. 24, 1981

[54] SEPARATION OF OIL FROM WATER

[75] Inventors: Edwin G. Larson, Midland; Daniel H. Haigh, Sanford; Richard H. Hall, Midland, all of Mich.

[73] Assignee: The Dow Chemical Company, Midland, Mich.

[21] Appl. No.: 758,280

[22] Filed: Jan. 10, 1977

[51] Int. Cl.³ .............................................. C02F 1/28
[52] U.S. Cl. .................................. 210/662; 210/680; 210/693; 210/90; 210/287
[58] Field of Search .......... 210/40, DIG. 26 P, 73 W, 210/36, 266, 287, 288, 289, 97, 130–133, 446, 662, 680, 693, 90

[56] References Cited

U.S. PATENT DOCUMENTS

| 2,632,012 | 3/1953 | Boldingh et al. | 210/40 |
| 3,214,368 | 10/1965 | Muller | 210/97 |
| 3,520,806 | 7/1970 | Haigh et al. | 210/40 |
| 3,752,762 | 8/1973 | Cincotta | 210/DIG. 26 |
| 3,794,583 | 2/1974 | Rhodes | 210/DIG. 26 |
| 3,888,766 | 6/1975 | DeYoung | 210/40 |
| 4,061,573 | 12/1977 | Biron | 210/288 |

*Primary Examiner*—Ivars C. Cintins
*Attorney, Agent, or Firm*—R. B. Ingraham

[57] ABSTRACT

Water containing traces of oil is cleaned by passing the oil containing water through a foraminous body, the foraminous body having a coating on the surface thereof of an oil-imbibing, oil-swellable latex polymer in a quantity sufficient to blind the foraminous body when the latex is oil swollen.

10 Claims, 2 Drawing Figures

SEPARATION OF OIL FROM WATER

In many instances, aqueous streams are contaminated with small amounts of oils such as petroleum oils. The oil may be in the stream in the form of minute droplets or microdroplets and/or may appear as a sheen or iridescence on the surface of the stream. Such streams are often treated by passing through American Petroleum Institute separators. Such separators usually employ at their discharge end an elongate rectangular channel having disposed therein at spaced intervals bales of straw interrupting the flow at the upper surface of the water. Oil is sorbed by the straw and when the straw has been saturated with oil, the bales are replaced. Such separators may remove a substantial portion of the oil from the water, however, the effluent from such separators generally contains an undesirable quantity of oil which serves to contaminate the environment. Various other means to separate small quantities of oil from water have been employed. Generally, such techniques are dependent upon the sorption of oil on a treating medium having a relatively high surface area such as activated carbon and the like. Such sorption beds generally decrease in efficiency rapidly and the effective or available surface area decreases as oil is added to the bed. Aqueous streams containing small quantities of oil have been cleansed of oil by passing the streams through a mixed bed of an oleophilic material and oil-imbibing beads wherein the oil carried in the aqueous stream is sorbed onto the surface of the oleophilic material and subsequently moved from the oleophilic surface by macrobeads of an oil-imbibing polymer. Such beds function well if it is possible to maintain admixture of the oleophilic material and the oil-imbibing beads. Generally, the oleophilic material is a ground plastic foam such as ground polyethylene foam or ground polyurethane foam. The bulk densities of such ground foam and the oil-imbibing beads differ sufficiently that it is difficult to maintain the desired homogeneity or at least uniformity of admixture of the two components within the bed to prevent channeling as the oil-imbibing beads swell to essentially shut-off flow in regions that have sorbed or imbibed sufficient oil to prevent further flow of water therethrough.

It would be desirable if there were available an improved method and apparatus for the treatment of aqueous streams containing oil.

It would also be desirable if there were available an improved sorption method for the treatment of aqueous streams containing small amounts of petroleum oil.

It would also be desirable if there were available an improved method and apparatus having a high capacity for the sorption of oil from aqueous streams.

These benefits and other advantages in accordance with the present invention are achieved in a method for the removal of organic liquids or oils from an aqueous stream, the steps of the method comprising passing an aqueous stream, preferably containing less than 1000 parts per million by weight of an oil, through an oil-sorbing bed, the sorbing bed comprising at least a first foraminous body which permits flow of water therethrough, the foraminous body having an oil-imbibing coating on the surface thereof, the oil-imbibing coating comprising a generally coherent mass of oil-imbibing latex particles, the latex particles being oil-swellable and oil-insoluble, the latex particles being swellable in oil from about 2 to 50 times their unswollen volume, the amount of the oil-swellable latex particle coating being sufficient that on swelling with oil the volume is sufficient to plug interstitial spaces within the foraminous body and prevent flow of water therethrough.

Also contemplated within the scope of the present invention is an apparatus for the removal of oil from aqueous streams, the streams preferably containing not more than 1000 parts per million by weight of oil based on the weight of the stream, the apparatus comprising means defining a stream receiving channel, a first foraminous sorption bed transversely disposed in the channel, the sorption bed being permeable to water and in sealing engagement with means defining the channel, whereby water flowing within the channel must flow through the bed, the improvement which comprises an oil-imbibing coating disposed on the surface of the foraminous body, the oil-imbibing coating comprising a latex coating of an oil-imbibing polymer which swells from 2 to 50 times the unswollen volume of the coating when contacted with oil, the amount of coating being sufficient that on swelling with oil the foraminous body is plugged and is no longer permeable to the aqueous stream. By the term "oil" as employed herein is meant oils or organic liquids which are generally immiscible with water or soluble to not more than two weight percent in water at 25° C. and atmospheric pressure. Such oils include: petroleum oils such as kerosene, lubricating oil, gasoline, jet fuel, and fuel oil. Other oils include: benzene, toluene, xylene, ethylbenzene, aliphatic hydrocarbons such as hexane, octane, dodecane, eicosane, position isomers thereof, cyclic hydrocarbons such as cyclohexane, ethylcyclohexane, ketones such as 2-octenone, 4-dodecenone, and chlorinated solvents such as 1,1,1-trichloroethane, o-dichlorobenzene and the like.

Figure 2:
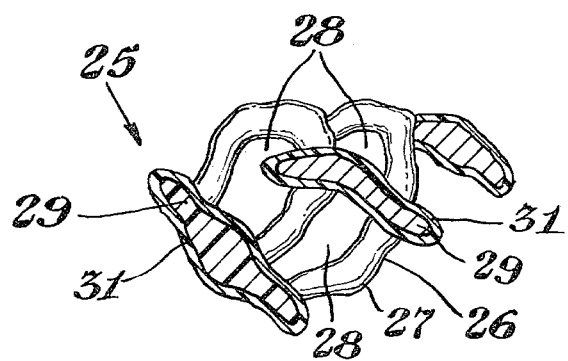

Further features and advantages of the present invention will become more apparent from the following specification taken in connection with the Drawing wherein:

FIG. 1 is a schematic representation of a filter apparatus in accordance with the invention; and FIG. 2 is a partly-in-section schematic representation of a foraminous body employed in the apparatus of FIG. 1.

In FIG. 1 there is schematically depicted an apparatus in accordance with the present invention generally designated by the reference numeral 10. The apparatus 10 comprises in cooperative combination a conduit or channel-defining means 11. The conduit 11 has a vertically-extending leg or means to indicate pressure drop 12 open to the atmosphere and an enlarged, filter bed containing portion 13. The conduit 11 contains an aqueous stream 14 flowing in the direction indicated by the arrows. The stream 14 contains preferably less than 1000 parts by weight of an oil or organic compound per million parts by volume of water. The conduit 11 has a discharge portion 15 remotely disposed from the leg 12 and disposed adjacent to the enlarged portion 13. A plurality of foraminous filter elements 17 are disposed within the enlarged portion 13 of the conduit 11 and are in generally sealing relationship with the adjacent portions of the enlarged portion 13 of the conduit 11. Adjacent the leg 12 is a foraminous filter bed retaining means 18 such as a metal screen. A second retaining means 19 is disposed generally adjacent the discharge end 15. The foraminous filter elements 17 as depicted in FIG. 1 are of generally planar discoidal configuration and permit the flow of water therethrough. Each of the foraminous elements 17 has a surface coating (not shown) of an oil-imbibing latex, the oil-imbibing latex being oil swellable and oil insoluble, the coating being swellable from 2 to 50 times the volume of the unswollen coating.

In FIG. 2 there is schematically depicted a fractional sectional view of a filter element 25. The filter element 25 comprises a foraminous body 26 having a plurality of cell walls 27 and a plurality of interstitial spaces 28. The element 25 comprises a foraminous substrate 29 which is generally water insoluble. The substrate 29 has disposed on the surface thereof an oil-imbibing coating 31. The oil-imbibing coating 31 is an oil-swellable latex coating having the hereinbefore-described oil swelling characteristics. In operation of the apparatus and practice of the method of the invention, an aqueous stream containing small quantities of oil is passed into conduit 11 as indicated by the arrow in FIG. 1. The aqueous stream passes through the filter elements 17 and is discharged from the discharge portion of the conduit 15. Small quantities of oil within the stream are imbibed by the latex coating such as the coating 31. The coating 31, as oil is added thereto, swells to form a plurality of swollen latex particles which agglomerate into viscous blobs which are carried downstream in the filter elements 17 and contact unswollen coating which removes the portion of the oil from the generally highly swollen particles in contact therewith to form blobs or globs of viscous agglomerated oil-swollen latex particles which reach a size sufficient to cause blinding of the filter. By the term "blinding" is meant that the interstitial spaces are plugged sufficiently to prevent flow of the aqueous stream therethrough. As the filter elements 17 become plugged, the level of the stream rises in the leg 12 until a predetermined head is obtained and the stream end shut off or diverted to another like filter and the filter elements 17 replaced with elements having an unswollen latex coating. In the practice of the present invention, a wide variety of materials may be employed as a substrate to support the oil-imbibing latex coating. Materials which are particularly desirable are flexible synthetic resinous foams such as open-cell polyurethane foams, open-cell polyolefin foams such as polyethylene foams, polypropylene foams, polybutene foams, polyvinylchloride foams, polybutadiene foams, polyisoprene foams, other rubber foams, and the like. Other materials useful as a substrate for coating with the oil-imbibing latex include: sand, vermiculite, bagasse, straw, sawdust, granular petroleum and wood charcoals, cokes, ground automobile and truck tires, metal shot, glass beads, glass foams and the like. Also suitable as substrates are fibrous bodies which employ natural or synthetic fibers and woven or non-woven configuration. For many applications it is desirable that the substrate be unaffected by the oil or organic liquid contained within the aqueous stream. This is particularly true where such sorbent beds will have a relatively long exposure to a contaminated aqueous stream. However, for many applications a substrate may be employed which is slowly attacked by the organic material within the aqueous stream. Typical of such applications are filters in which the pressure drop across them is continuously monitored and replacement is made rapidly when the filter has been blinded. It is generally essential that the rate of swelling of the latex polymer coating be substantially greater than the rate of swelling or dissolving of the substrate. For applications wherein an organic liquid sensitive substrate is employed, generally it is desirable that the swellable latex polymer swell at least twice the rate at which the substrate swells or dissolves.

Latex polymers useful in the practice of the present invention are latexes of any polymers which swell on contact with oils. Useful latex polymers may swell on contact with water. However, additional swelling must occur when contacted with the oil or organic material to be removed. Selection of a polymer for use with any oil or organic liquid is readily accomplished by determining a swelling index for the latex polymer particles in the particular liquid to be soaked or imbibed. Beneficially, such a swelling index is readily determined by immersing a latex polymer in the desired oil or organic liquid and determining the volume per unit weight of latex polymer after a period of 30 minutes with water and oil. The ratio of the volume per unit weight with organic liquid and without the oil or organic liquid provides the swelling index. If the polymer is soluble, the swelling index is infinite. If the swelling index is greater than about 1.2, the polymer particles are useful in the practice of the present invention. Beneficially for most applications a swelling index of at least 1.5 and preferably greater than about 3 is desirable. It is critical to the practice of the present invention to employ a crosslinked polymer which swells but does not dissolve. If the polymer swells in the presence of the organic liquid and water, it is suitable for the practice of the present invention. However, for most applications it is desirable to employ a polymer which is crosslinked to a sufficient degree that it exhibits a swelling index between about 1.5 and 50 and preferably between about 3 and 50. A wide variety of polymeric materials are employed with benefit. Such polymers include polymers of styrenes and substituted styrenes; polyvinyl chloride copolymers of vinyl chloride such as a copolymer of 60 weight percent vinyl chloride and 40 weight percent vinyl acetate; polymers and copolymers of vinylidene chloride including a copolymer of 75 percent vinylidene chloride and 25 percent acrylonitrile; acrylic polymers such as polymers of methylmethacrylate, ethyl acrylate and the like. In general the chemical composition of the polymers is not critical. The polymers must show significant swelling; that is, at least 25 percent increase in volume in a period of at least 10 minutes in the organic liquid to which the polymers are required to respond under desired service conditions of temperature and pressure. Particularly advantageous materials which respond to a wide variety of organic liquids are polymers of styrene such as polystyrene and polymers of styrene and divinylbenzene containing up to about 10 weight percent divinylbenzene. For general use with aliphatic and aromatic hydrocarbons, alkylstyrene polymers and copolymers are of particular benefit. Such alkylstyrene polymers swell very rapidly on contact with aliphatic and/or aromatic hydrocarbons. Generally, the more rapid the swelling of the polymer the more rapid the shutoff when the organic liquid is contacted. Alkylstyrene polymers and copolymers usually show substantial swelling when in contact with so called Number 2 Diesel oil in less than 1 minute.

Preferably, crosslinked polymers and copolymers of styrenes, and advantageously of tertiary-alkylstyrenes, are utilized as the imbibing latex polymers in the process of this invention. Those alkylstyrenes which can be used to prepare these polymers have alkyl groups containing from 4 to 20, and preferably from 4 to 12, carbon atoms, such as: tertiary-alkylstyrenes including for example, p-tert-butylstyrene, p-tert-amylstyrene, p-terthexylstyrene, p-tert-octylstyrene, p-tert-dodecylstyrene, p-tert-octadecylstyrene, and p-tert-eicosylstyrene; n-alkylstyrenes including, for example, n-butylstyrene, n-amylstyrene, n-hexylstyrene, n-octylstyrene, n-dodecylstyrene, n-octadecylstyrene, and n-eicosylstyrene; sec-alkylstyrenes including, for example, sec-butylstyrene, sec-hexylstyrene, sec-octylstyrene, sec-dodecylstyrene, sec-octadecylstyrene, and sec-eicosylstyrene; isoalkylstyrenes including, for example, isobutylstyrene, isoamylstyrene, isohexylstyrene, isooctylstyrene, isododecylstyrene, isooctadecylstyrene, and isoeicosylstyrene; and copolymers thereof.

Especially preferred for use in the practice of the invention are crosslinked copolymers of such alkylstyrenes as heretofore described and an alkyl ester derived from $C_1$ to $C_{24}$ alcohol and acrylic or methacrylic acid or mixture thereof.

Suitable monomers which may be employed as comonomers with the alkylstyrene include such materials as vinylnaphthalenes, styrene, vinyltoluenes, α-methylstyrene, ring substituted α-methylstyrenes, halostyrenes, arylstyrenes and alkarylstyrenes; methacrylic esters, arcylic esters, fumarate esters and half esters, maleate esters and half esters, itaconate esters and half esters, vinyl biphenyls, vinyl esters of aliphatic carboxylic acids, alkyl vinyl ethers, alkyl vinyl ketones, α-olefins, isoolefins, butadiene, isoprene, dimethylbutadiene, acrylonitrile, methacrylonitrile and the like.

It is desirable that the latex polymers used in the process of the invention contain a slight amount of crosslinking agent, preferably in the range of from about 0.01 to 2 percent by weight. The most efficient imbibition of oil and like organic liquid contaminants occurs when the level of crosslinking agent is less than about 1 percent since this permits the polymers to swell easily and imbibe a substantial volume of the oganic material. When organic liquid-contaminated water is percolated through a sorption bed containing 25 volume percent latex polymer coating, up to 2 percent crosslinking agent is satisfactory because a lower volume of organic material imbibed by the polymer can be tolerated in this type of operation.

Crosslinking agents which can be used in preparing the imbibing latex polymers suitable for use in the present invention include polyethylenically unsaturated compounds such as divinylbenzene, diethylene glycol dimethacrylate, diisopropenylbenzene, diisoproppenyldiphenyl, diallylmaleate, diallylphthalate, allylacrylates, allylmethacrylates, allylfumarates, allylitaconates, alkyd resin types, butadiene or isoprene polymers, cyclooctadiene, methylene norbornylenes, divinyl phthalates, vinylisopropenylbenzene, divinylbiphenyl, as well as any other di- or poly-functional compounds known to be of use as a crosslinking agent in these polymeric vinyl addition compositions. Normally, the latex polymer containing the crosslinking agent swells with the imbibed organic material. If there is too much crosslinking agent, the imbibition takes an unreasonably long time or the latex polymer is unable to imbibe a sufficient quantity of the organic liquid to close the interstitial spaces in the bed. If the imbibitional polymer contains no crosslinking agent or too little crosslinking agent, then it will dissolve eventually in the organic material resulting, for example, into a non-discrete, non-particulate mass of polymer-thickened organic liquid which may not effectively stop the flow.

Polymers for the practice of the present invention are prepared by emulsion polymerization processes and advantageously are free radical catalyzed or initiated. For most applications, it is desirable that latexes for use in the practice of the present invention have a particle size of from about 500 angstroms to about 2000 angstroms although smaller and larger latex particles may be employed. Techniques for the preparation of such latexes are well known in the art and are described in the following U.S. Pat. Nos. 2,795,564; 2,914,499; 3,062,765; 3,177,173; 3,404,116; 3,480,578 and 3,882,230. Further information relating to emulsion polymerization is set forth in "High Polymer Latices" D. C. Blackley, Palmerton Publishing, Co., Inc. New York 1966. The teaching of the foregoing references are herewith incorporated by reference thereto.

By way of further illustration, an oil-imbibing latex was prepared by polymerizing 30 parts by weight of a mixture of 70 percent by weight tertiarybutylstyrene, 20 percent by weight of 2-ethylhexyl acrylate, 10 percent by weight of mixed methacrylate esters of cetyl to eicosyl alcohols, and 0.075 percent by weight (active) based on the weight of the foregoing three monomers of a one-to-one by weight mixture of divinylbenzene and diethylbenezene, in the presence of 70 parts by weight of water containing one-half part by weight (based on monomers (BOM) of potassium persulfate, one percent by weight based on the weight of the monomers of sodium bicarbonate, two percent by weight BOM of a surface active agent which was a sodium salt of mixed long chain alkyl sulfates commercially available under the Trade Designation of Duponol WN. The polymerization was conducted in the following manner: twenty percent of the water containing the potassium persulfate and sodium bicarbonate and two weight percent of the total monomer mixture was added to the reactor. The reactor was agitated and heated to 80° C. for a period of one-half hour. At the end of the half-hour period, the remaining monomer and water solution of potassium persulfate and bicarbonate was added at a constant rate over a period of five hours. At the end of the addition of monomer and water, the reaction mixture was maintained at 80° C. with agitation for an additional one-hour period. At the end of the one-hour period, the reaction vessel and contents were cooled to about 35° C. The reaction mixture was filtered to remove any coagulum. A latex was obtained having a particle size of about 1000 angstroms which was 28.2 percent solids. The resultant latex was employed to coat a plurality of open-cell polyurethane discs, 3½ inches in diameter and ¼ inch in thickness. The discs were coated by dipping into the latex, squeezing excess latex therefrom and drying at 80° C. for a period of 16 hours. The dip, squeeze, and dry procedure was repeated to provide various coating weights on the polyurethane foam. The polyurethane foam had a density of 1.7 pounds per cubic foot and 41±5 pores per lineal inch and an airflow rate of 8 cubic feet per minute through a 4-square inch sample, ¼ inch thick under a pressure of ½ inch of water. A plurality of experiments were conducted using coated urethane discs having various coating weights of the latex thereon and discs having no coating thereon. The apparatus employed was that as generally depicted in FIG. 1 and the effluent to be filtered was water containing No. 2 Fuel Oil. The test apparatus was fed water at a rate of 25 gallons/hour and No. 2 Fuel Oil at 25 milliliters/hour. Prior to entry of the water-oil mixture into the foraminous disc filter, the water and oil were admixed with a propeller-type agitator to provide a fine dispersion of the oil in water. The experiments were discontinued when water rose in the leg equivalent to the leg 12 at a height of 48 inches or when there was evidence of oil passing through the filter assembly. A first set of urethane foam discs was employed which had no urethane coating. The head level, that is, the height of water in the leg 12 after one hour was about three inches and an oil slick appeared in the effluent at this time. A set of discs which had a coating weight of 23.8 percent of the hereinbefore-described latex was employed and the initial head was about five inches and a slick appeared after two and one-half hours at a head height of approximately six inches. Three series of discs were then used having coating weights of 59.7 weight percent latex solids, 33.5 weight percent latex solids and 55.5 weight percent latex solids. Head height of 48 inches with no slick breakthrough was achieved after about three hours and ten minutes with the discs coated with 59.7 and 55.5 latex solids with no apparent breakthrough of the fuel oil. The urethane foam coated with 33.5 weight percent latex solids provided head height of 48 inches in slightly under three hours. In all cases, a small but unmeasured quantity of duPont Oil Red A (an oil soluble dye) was incorporated in the fuel oil to aid in determining its distribution within the coated foam discs. A sample of foam coated with 42.7 percent latex exhibited some sludge breakthrough after a period of about three hours and thirty-five minutes and a head height of about 37½ inches. This sample exhibited channeling and the results are believed to be due to a nonuniform foam sample. In all cases where the water was passed through the latex-coated foam samples and no evidence of the oil appeared, that is, the red coloration did not extend entirely through the bed, no evidence of oil in the effluent was obtained by either odor or taste.

Due to the wide variety of organic materials which can be separated from water employing the present invention, the wide variety of oil-imbibing latexes and the wide variety of substrates, if it is desirable to determine the suitability of any combination of organic material, latex and substrate, and latex-coating weight, a convenient method of determining the suitability of the combination is to provide a coated bed, six inches in thickness, and add in a dropwise manner the organic liquid to be removed from the aqueous stream at a temperature of about 75° F. Beneficially, in such an experiment, it is convenient to include a dye which readily indicates the presence of the organic liquid in the bed. If the six-inch bed plugs, that is, does not permit flow of the organic liquid under a six-inch head, the combination is suitable for the practice of the invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the removal of organic liquids or oils from an aqueous stream, the steps of the method comprising passing an aqueous stream containing less than 1000 parts per million by weight of an organic liquid or oil, through an organic liquid or oil-sorbing bed, the sorbing bed comprising at least a first foraminous body which permits flow of water therethrough, the foraminous body having an organic liquid or oil-imbibing coating on the surface thereof, the organic liquid or oil-imbibing coating comprising a generally coherent mass of organic liquid or oil-imbibing latex particles, the latex particles being of a cross-linked polymer which is organic liquid or oil-swellable and organic liquid or oil-insoluble, the latex particles being swellable in organic liquid or oil from about 2 to 50 times their unswollen volume, the amount of the organic liquid or oil-swellable latex particle coating being sufficient that on swelling with organic liquid or oil the volume is sufficient to plug interstitial spaces within the foraminous body and prevent flow of water therethrough.

2. The method of claim 1 wherein the foraminous body is a coherent body.

3. The method of claim 2 wherein the foraminous body is an open-cell plastic foam.

4. The method of claim 1 wherein the foraminous body is a particulate body.

5. The method of claim 1 including the step of monitoring the pressure drop through the foraminous body.

6. An apparatus for the removal of organic liquid or oil from aqueous streams, the streams preferably containing not more than 1000 parts per million by weight based on the weight of the stream of organic liquid or oil, the apparatus comprising means defining a stream receiving channel, a first foraminous sorption bed or body transversely disposed in the channel, the sorption bed being permeable to water and in sealing engagement with means defining the channel, whereby water flowing within the channel must flow through the bed, the improvement which comprises an organic liquid or oil-imbibing coating disposed on the surface of the foraminous body, the organic liquid or oil-imbibing coating comprising a latex coating of an organic liquid or oil-imbibing polymer which swells from 2 to 50 times the unswollen volume of the coating when contacted with organic liquid or oil, the amount of coating being sufficient that on swelling with organic liquid or oil the foraminous body is plugged and is no longer permeable to the aqueous stream.

7. The apparatus of claim 6 wherein the foraminous body is a coherent body.

8. The apparatus of claim 6 wherein the foraminous body is a particulate body.

9. The apparatus of claim 6 including means to indicated pressure drop through the foraminous body.

10. The apparatus of claim 6 wherein the foraminous body is a plastic foam.

* * * * *